United States Patent
Zhang et al.

(10) Patent No.: US 10,855,576 B2
(45) Date of Patent: Dec. 1, 2020

(54) INFORMATION TRANSMISSION METHOD AND DEVICE

(71) Applicant: ZTE CORPORATION, Shenzhen (CN)

(72) Inventors: Zheng Zhang, Shenzhen (CN); Cui Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/067,671

(22) PCT Filed: Jul. 11, 2016

(86) PCT No.: PCT/CN2016/089675
§ 371 (c)(1),
(2) Date: Jul. 2, 2018

(87) PCT Pub. No.: WO2017/117956
PCT Pub. Date: Jul. 13, 2017

(65) Prior Publication Data
US 2019/0014035 A1    Jan. 10, 2019

(30) Foreign Application Priority Data
Jan. 4, 2016    (CN) .......................... 2016 1 0006322

(51) Int. Cl.
*H04L 12/761*    (2013.01)
*H04L 12/46*    (2006.01)

(52) U.S. Cl.
CPC .............. *H04L 45/16* (2013.01); *H04L 12/46* (2013.01); *H04L 12/4633* (2013.01); *H04L 12/4641* (2013.01)

(58) Field of Classification Search
CPC ..... H04L 45/16; H04L 12/46; H04L 12/4633; H04L 12/4641; H04L 12/18; H04L 29/12;
(Continued)

(56) References Cited

U.S. PATENT DOCUMENTS

| 5,684,800 A | 11/1997 | Dobbins |
| 5,825,772 A | 10/1998 | Dobbins |

(Continued)

FOREIGN PATENT DOCUMENTS

| CN | 102946355 A | 2/2013 |
| CN | 103973825 A | 8/2014 |

(Continued)

OTHER PUBLICATIONS

Supplementary European Search Report in the European application No. 16883091.7, dated Feb. 12, 2019, 7 pgs.

(Continued)

*Primary Examiner* — Hardikkumar D Patel
(74) *Attorney, Agent, or Firm* — Morgan, Lewis & Bockius LLP

(57) ABSTRACT

An information transmission method and device, comprising: when being connected to a virtual network, a network edge node encapsulates the virtual network identifier of the connected virtual network in a multicast protocol packet; the network edge node sends the multicast protocol packet to network edge nodes other than itself. The information transmission method can implement delivery of a virtual network identifier, thereby implementing highly efficient transmission of virtual network data.

9 Claims, 9 Drawing Sheets

(58) Field of Classification Search
CPC . H04L 12/1886; H04L 45/64; H04L 12/4645; H04L 12/185; H04L 61/2069; H04L 12/56; H04L 12/1854; H04L 45/00; H04L 45/04; H04L 45/306; H04L 45/48; H04L 45/50; H04L 45/60

See application file for complete search history.

(56) References Cited

U.S. PATENT DOCUMENTS

| | | | |
|---|---|---|---|
| 5,946,308 | A | 8/1999 | Dobbins |
| 6,147,995 | A | 11/2000 | Dobbins |
| 9,143,336 | B2 | 9/2015 | Jain et al. |
| 9,154,416 | B2 | 10/2015 | Koganti |
| 2005/0083949 | A1 | 4/2005 | Dobbins |
| 2006/0248227 | A1 | 11/2006 | Hato |
| 2009/0059923 | A1* | 3/2009 | Guo ............. H04L 45/48 370/390 |
| 2010/0177778 | A1 | 7/2010 | Dobbins |
| 2010/0182934 | A1 | 7/2010 | Dobbins |
| 2015/0181309 | A1* | 6/2015 | Shepherd ........ H04N 21/6125 725/109 |
| 2016/0142220 | A1 | 5/2016 | Hao et al. |

FOREIGN PATENT DOCUMENTS

| | | |
|---|---|---|
| CN | 104253698 A | 12/2014 |
| CN | 104410560 A | 3/2015 |
| CN | 104917682 A | 9/2015 |
| EP | 0861544 A1 * | 9/1998 ......... H04L 41/0213 |
| EP | 0861544 A1 | 9/1998 |
| EP | 1705840 A1 | 9/2006 |
| WO | 2014205784 A1 | 12/2014 |
| WO | 2015135499 A1 | 9/2015 |

OTHER PUBLICATIONS

"Efficient Multicasting and Broadcasting in Layer 2 Provider Backbone Networks", Nov. 2005, ANUSH ELANGOVAN, IEEE Communications Magazine, IEEE Service Center, Piscataway,US, vol. 43, No. 11, pp. 166-170.

International Search Report in international application No. PCT/CN2016/089675, dated Oct. 14, 2016, 2 pgs.

English Translation of the Written Opinion of the International Search Authority in international application No. PCT/CN2016/089675, dated Oct. 14, 2016, 3 pgs.

"Generic UDP Encapsulation (GUE) for Network Virtualization Overlay", draft-hy-nvo3-gue-4-nvo-02, Jun. 15, 2015, L. Yong, T. Herbert and O. Zia, Network Working Group, 9 pgs.

"BIER Use Cases", Oct. 25, 2014, N. Kumar, R. Asati, M. Chen and X. Xu, Network Working Group, 7 pgs.

"BIER Use Case in VxLAN, draft-wang-bier-vxlan-use-case-00" Oct. 11, 2015,C. Wang, Z. Zhang and F. Hu, BIER WG, 11 pgs.

* cited by examiner

```
+-+-+-+-+-+-+-+-+-+-+-+-+-+-+-+-+-+-+-+-+-+-+-+-+-+-+-+-+-+-+-+-+
|F|E| Type = 6  | Length = 1   |  Transport  | Address family |
+-+-+-+-+-+-+-+-+-+-+-+-+-+-+-+-+-+-+-+-+-+-+-+-+-+-+-+-+-+-+-+-+
|          type                |           length              |
+-+-+-+-+-+-+-+-+-+-+-+-+-+-+-+-+-+-+-+-+-+-+-+-+-+-+-+-+-+-+-+-+
|                                                              |
.                                                              .
.                 Virtual Network Identifier                   .
.                                                              .
|                                                              |
+-+-+-+-+-+-+-+-+-+-+-+-+-+-+-+-+-+-+-+-+-+-+-+-+-+-+-+-+-+-+-+-+
```

FIG. 7

INFORMATION TRANSMISSION METHOD AND DEVICE

TECHNICAL FIELD

The disclosure relates to, but is not limited to, the field of communications, and in particular to an information transmission method and device.

BACKGROUND

In recent years, a Data Center (DC), as a virtual network, has been rapidly developed, and the Internet has also changed and developed. The DC is all-inclusive, from the earliest disaster backup center for important data to the computer room construction of an enterprise user, including Chinese custody services and information port services, all of which provide related development protection for the DC. The DC is a complex set of facilities, which not only includes a computer system and other supporting devices (such as communication and storage systems), but also includes redundant data communication connections, an environmental control device, a monitoring device and various security devices. The development trend of an enterprise-class DC is high flexibility and adaptability, such as the ability to make rapid changes in accordance with external needs. With the development of a Software Defined Network (SDN) technology and a Network Function Virtualization (NFV) technology, the DC is also moving toward virtualization. Because of the characteristics of the DC, an important problem faced by the DC is that "they are virtual islands", and virtualized servers, storage devices and networks are managed separately. How to realize interconnection of these isolated islands on the Internet and provide resource protection services are all important development directions of the current network.

Intra-DC and inter-DC need to be connected through an intermediate network. The intermediate network generally includes an existing Internet Protocol (IP) network, a Multi Protocol Label Switch (MPLS) network, a Layer 3 Virtual Private Network (L3VPN), a Bit Indexed Explicit Replication (BIER) network, and the like. How to adapt to an efficient DC connection and deliver DC-related information and services are all hotly debated. When data in the DC is delivered through a network, it will be encapsulated once again. Under the current technological development, a Virtual Extensible Local Area Network (VxLAN), Network Virtualization using Generic Routing Encapsulation (GRE) (NVGRE), GRE, and MLS Over GRE are all data encapsulation technologies. After receiving a packet with these encapsulation identifiers from the intermediate network, a network edge node restores into an original DC packet and sends it to the corresponding DC network. In a virtual network such as a DC, there is often a lot of data that needs to be sent via broadcast or multicast. For example, data is synchronized and backed up. Such data may now be encapsulated through an encapsulation technology and then transmitted in a network through a unicast tunnel. However, there is no good solution for how to cooperate with existing multicast methods and make these data efficiently transmitted in an intermediate network.

SUMMARY

The following is a summary of the subject detailed herein. This summary is not intended to limit the scope of the claims.

The disclosure provides an information transmission method and device, capable of implementing delivery of a virtual network identifier and then efficient transmission of virtual network data.

The disclosure provides an information transmission method, including: when a network edge node is connected to a virtual network, the network edge node encapsulates a virtual network identifier of the connected virtual network into a multicast protocol packet; and the network edge node sends the multicast protocol packet to one or more network edge nodes other than the network edge node per se.

Optionally, the method may further include: the network edge node receives a multicast protocol packet encapsulated with a virtual network identifier from each of the one or more network edge nodes other than the network edge node per se.

Herein, after the network edge node receives the multicast protocol packet encapsulated with the virtual network identifier from each of the one or more network edge nodes other than the network edge node per se, the method may further include: the network edge node determines, according to one or more received multicast protocol packets, a network edge node set corresponding to the virtual network identifier of the virtual network to which the network edge node per se is connected.

Herein, after the network edge node determines, according to the one or more received multicast protocol packet, the network edge node set corresponding to the virtual network identifier of the virtual network to which the network edge node per se is connected, the method may further include: the network edge node sends, in a multicast manner, a packet encapsulated with to-be-transmitted data of the virtual network to which the network edge node per se is connected to one or more network edge nodes in the network edge node set corresponding to the virtual network identifier of the virtual network.

Optionally, the virtual network identifier includes: a VxLAN identifier, a NVGRE virtual sub-network identifier or an identifier capable of uniquely identifying a virtual network.

Optionally, the multicast protocol packet includes: a Multicast Listener Discover (MLD) packet, an Internet Group Management Protocol (IGMP) packet, and a Protocol Independent Multicast (PIM) packet.

The disclosure also provides an information transmission device, applied to a network edge node, and including: an encapsulation module, arranged to encapsulate, when the network edge node is connected to a virtual network, a virtual network identifier of the connected virtual network into a multicast protocol packet; and a transmission module, arranged to send the multicast protocol packet to one or more network edge nodes other than the network edge node per se.

Optionally, the transmission module is further arranged to receive a multicast protocol packet encapsulated with a virtual network identifier from the one or more network edge nodes other than the network edge node per se.

Herein, the device further includes: an information management module, arranged to determine, according to one or more received multicast protocol packets, a network edge node set corresponding to the virtual network identifier of the virtual network to which the network edge node per se is connected.

Herein, the transmission module is further arranged to send, in a multicast manner, a packet encapsulated with to-be-transmitted data of the virtual network to which the network edge node per se is connected to one or more network edge nodes in a network edge node set corresponding to a virtual network identifier of the virtual network.

Optionally, the virtual network identifier includes: a VxLAN identifier, a NVGRE virtual sub-network identifier or an identifier capable of uniquely identifying a virtual network.

Optionally, the multicast protocol packet includes: an MLD packet, an IGMP packet, and a PIM packet.

The embodiment of the disclosure also provides a computer-readable storage medium, which stores a computer-executable instruction. When the computer-executable instruction is executed, the information transmission method is implemented.

In the disclosure, when a network edge node is connected to a virtual network, the network edge node encapsulates a virtual network identifier of the connected virtual network into a multicast protocol packet; and the network edge node sends the multicast protocol packet to one or more network edge nodes other than the network edge node per se. The disclosure can implement signaling propagation of a virtual network identifier in a network, thereby implementing efficient transmission of virtual network data.

Moreover, the network edge node determines, according to the received multicast protocol packet(s), a network edge node set corresponding to the virtual network identifier of the virtual network to which the network edge node per se is connected. In the disclosure, a corresponding relationship between each virtual network and a network edge node set related thereto is determined, thereby implementing various functions such as broadcasting, synchronization and backup of data of a virtual network (including a DC), and implementing important functions of an intermediate network connected with the virtual network. In this way, not only the use and deployment scenarios of the DC are expanded, but also the development of the DC, the development of SDN and NFV technologies and the development of an intermediate network technology are promoted.

Other aspects may be understood after reading and understanding the drawings and detailed description.

BRIEF DESCRIPTION OF DRAWINGS

FIG. 7 is a schematic diagram of a PIM protocol extension according to an embodiment of the disclosure.

DETAILED DESCRIPTION

The following describes the embodiments of the disclosure in detail with reference to the accompanying drawings.

It should be understood that the embodiments described below are only used to illustrate and explain the disclosure and are not used to limit the disclosure.

Figure 1:
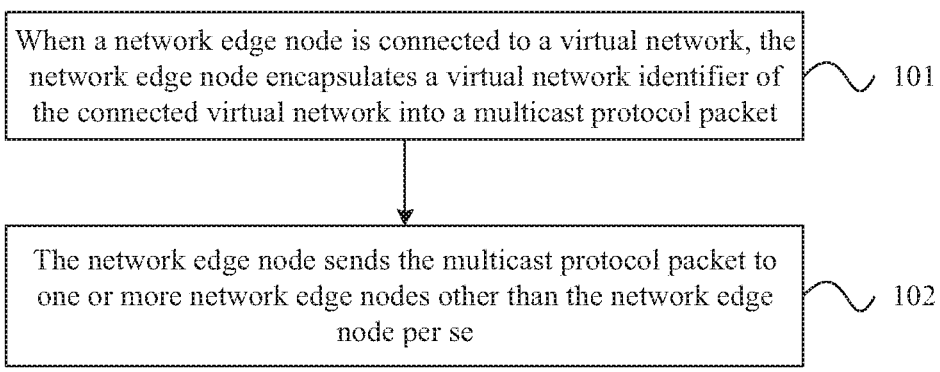
FIG. 1 is a flowchart of an information transmission method according to an embodiment of the disclosure.

FIG. 1 is a flowchart of an information transmission method according to an embodiment of the disclosure. As shown in FIG. 1, the information transmission method provided in the present embodiment includes the following steps.

At S101, when a network edge node is connected to a virtual network, the network edge node encapsulates a virtual network identifier of the connected virtual network into a multicast protocol packet.

At S102, the network edge node sends the multicast protocol packet to one or more network edge nodes other than the network edge node per se.

Herein, the method farther includes: the network edge node receives a multicast protocol packet encapsulated with a virtual network identifier from each of the one or more network edge nodes other than the network edge node per se.

Herein, after the network edge node receives the multicast protocol packet encapsulated with the virtual network identifier from each of the one or more network edge nodes other than the network edge node per se, the method further includes: the network edge node determines, according to the one or more received multicast protocol packets, a network edge node set corresponding to the virtual network identifier of the virtual network to which the network edge node per se is connected.

Herein, after the network edge node determines, according to the one or more received multicast protocol packets, the network edge node set corresponding to the virtual network identifier of the virtual network to which the network edge node per se is connected, the method further includes: the network edge node sends, in a multicast manner, a packet encapsulated with to-be-transmitted data of the virtual network to which the network edge node per se is connected to one or more network edge nodes in the network edge node set corresponding to the virtual network identifier of the virtual network.

Optionally, the virtual network identifier includes: a VxLAN identifier, a NVGRE virtual sub-network identifier or an identifier capable of uniquely identifying a virtual network.

Optionally, the multicast protocol packet includes: an MLD packet, an IGMP packet, and a PIM packet.

Optionally, the virtual network identifier is encapsulated in the multicast protocol packet in a Type-Length-Value (TLV) form.

Optionally, a packet header of the multicast protocol packet carries a virtual network indication identifier, used to indicate whether the multicast protocol packet carries a virtual network identifier.

Figure 2:
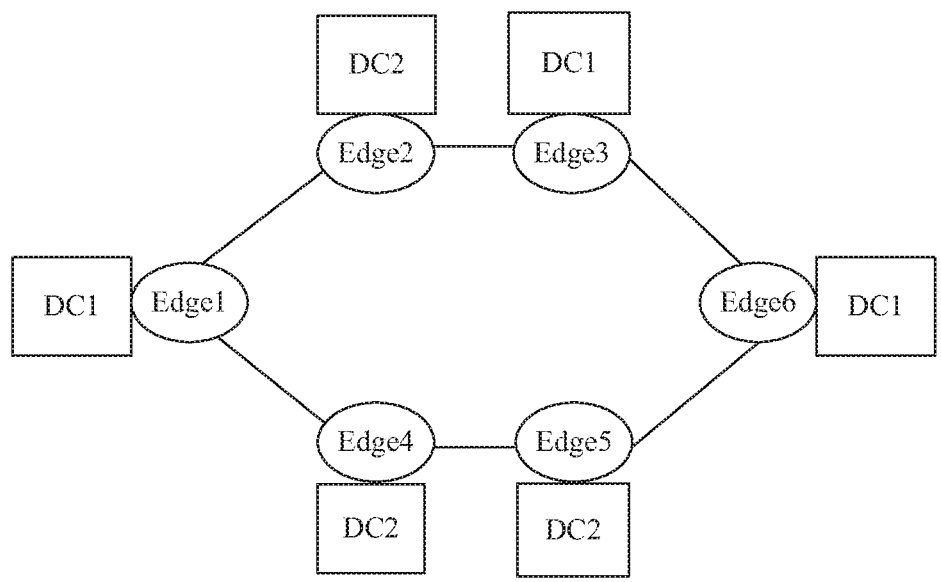
FIG. 2 is a schematic diagram of a virtual network interconnected by a network.

FIG. 2 is a schematic diagram of a virtual network (such as a DC) interconnected by a network. As shown in FIG. 2, according to an embodiment of the disclosure, network edge nodes (Edge) 1 to Edge6 firstly exchange with each other, through a multicast protocol, their respective virtual network identifiers of DCs to which they are connected, and Edge1 will learn that a virtual network identifier encapsulated with respect to DC1 corresponds to a set of Edge3 and Edge6. Similarly, Edge2 will interactively learn, through the multicast protocol, that a virtual network identifier encapsulated with respect to DC2 corresponds to a set of Edge4 and Edge5.

If a certain network edge node is connected to multiple virtual networks simultaneously, corresponding network edge node sets will be managed separately for different virtual network identifiers. When the network edge node notifies of multiple virtual network identifiers connected simultaneously to the network edge node per se, one or more virtual network identifiers of the same type may be encapsulated into one multicast protocol extension, or may be presented in different extensions. The disclosure is not limited thereto. In addition, when a certain network edge node is no longer connected to a certain virtual network, it is declared through multicast protocol signaling that it is no longer connected to the virtual network. Therefore, the network edge node is deleted from the network edge set node corresponding to the virtual network identifier of the virtual network.

Figure 3:
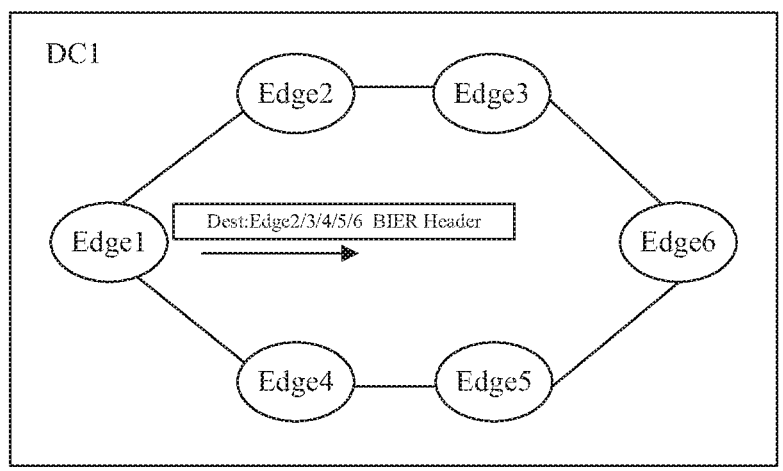
FIG. 3 is a schematic diagram of network interconnection of a virtual network.

FIG. 3 is a schematic diagram of network interconnection of a virtual network (such as a DC interior). As shown in FIG. 3, according to an embodiment of the disclosure, network edge devices that belong to a same DC interior exchange with each other, through a multicast protocol, virtual network identifiers of their respective connected DCs to obtain a network edge node set corresponding to each virtual network identifier. When content in the DC needs to be multicast or broadcast to the corresponding network edge node set, the content may be delivered directly and efficiently in a multicast manner.

Here, for example, a transmission mode in the network is that content or data is encapsulated in a BIER packet for transmission. A destination address (Dest) of the BIER packet indicates that other network edge nodes include Edge2, Edge3, Edge4, Edge5 and Edge6. After such transmission through an intermediate BIER network, multicast protocol information arrives at other network edge nodes. The network edge nodes obtain information regarding their respectively connected virtual networks in this manner. The intermediate network may have different encapsulation forms for a multicast protocol packet depending on the type of the intermediate network. It is assumed that an intermediate network is an MPLS network, then the multicast protocol packet may also be encapsulated in a multicast Label Distribution Protocol (mLDP) and a Point-to-Multipoint Traffic Engineering (P2MP TE) tunnel for transmission. A special multicast IP packet may also be defined to transmit a multicast protocol packet.

Figure 4:
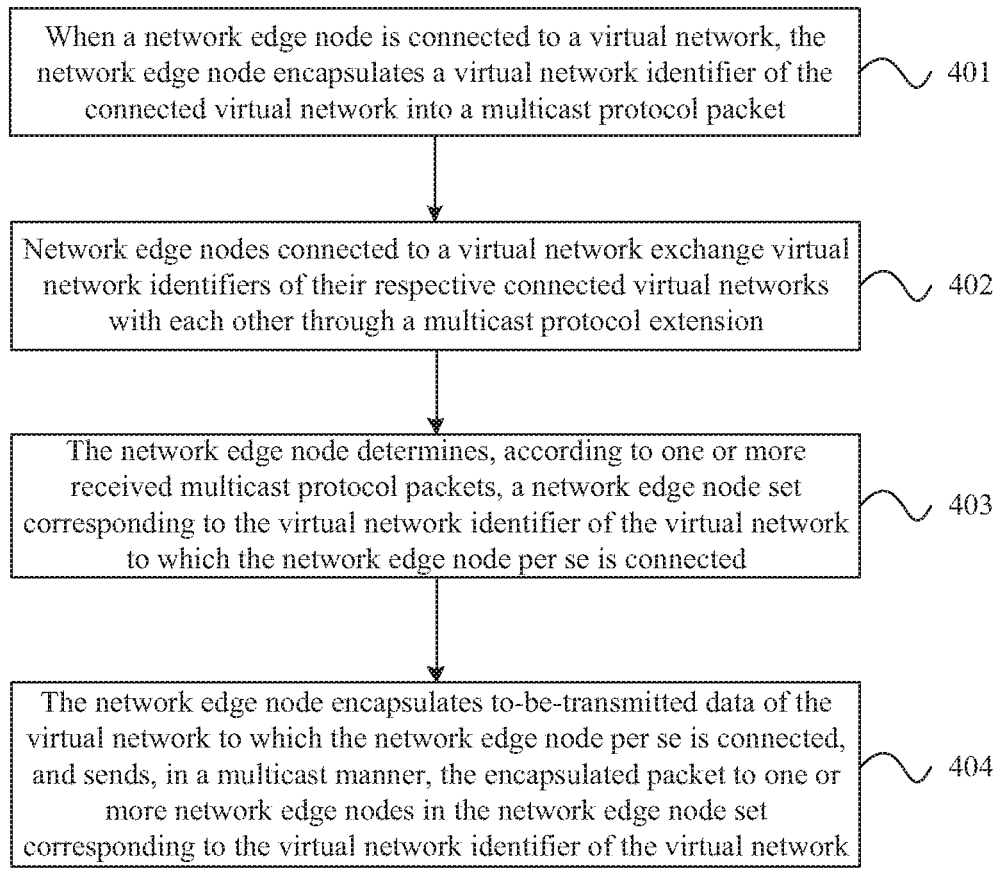
FIG. 4 is an optional flowchart of an information transmission method according to an embodiment of the disclosure.

FIG. 4 is an optional flowchart of an information transmission method according to an embodiment of the disclosure. As shown in FIG. 4, the information transmission method provided by the present embodiment includes the following steps.

At S401, when a network edge node is connected to a virtual network, the network edge node encapsulates a virtual network identifier of the connected virtual network into a multicast protocol packet.

At S402, network edge nodes connected to a virtual network exchange virtual network identifiers of their respective connected virtual networks with each other through a multicast protocol extension.

At S403, the network edge node determines, according to one or more received multicast protocol packets, a network edge node set corresponding to the virtual network identifier of the virtual network to which the network edge node per se is connected. Specifically, the network edge node organizes and generates a corresponding relationship between the virtual network identifier and the corresponding network edge node set according to the received multicast protocol information. That is, after exchanging between network edge nodes through multicast protocol packets, each network edge node learns the network edge node information corresponding to respective different virtual networks.

At S404, the network edge node encapsulates to-be-transmitted data of the virtual network to which the network edge node per se is connected, and sends, in a multicast manner, the encapsulated packet to one or more network edge nodes in the network edge node set corresponding to the virtual network identifier of the virtual network.

For a data packet of a DC with multicast and broadcast requirements, the data packet is directly sent to a network edge node corresponding to a virtual network identifier of the DC in a multicast manner, thereby completing various functions such as broadcast, synchronization and backup of a data packet of the virtual network.

Figure 5:
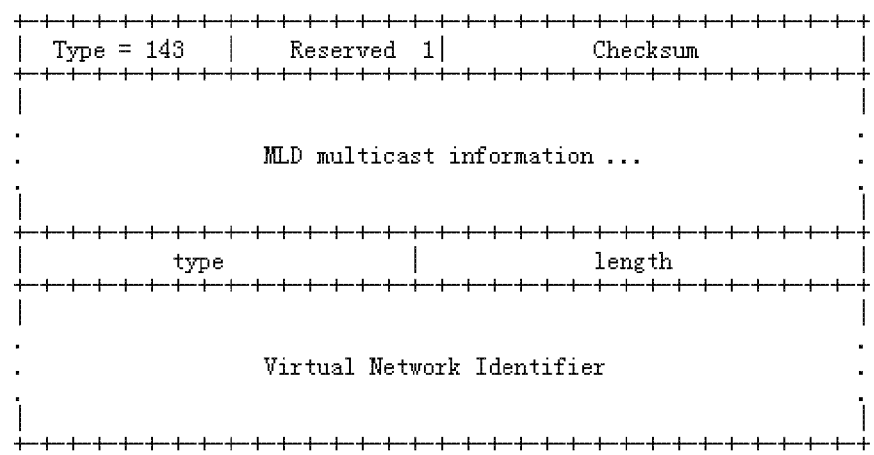
FIG. 5 is a schematic diagram of an MLD protocol extension according to an embodiment of the disclosure.

FIG. 5 is a schematic diagram of an MLD protocol extension according to an embodiment of the disclosure. As shown in FIG. 5, in an MLD packet header, an existing reserved field may be used to select one bit to set to 1 so as to represent that there is subsequent virtual network identification information; and if compatibility or other aspects are taken into consideration, a new field may also be defined for representation. In addition, the virtual network identification information may be added in both MLD query and report packets or may only be added in the Report packet. This is only an example.

Notification of a multicast protocol extension in a network edge node may be implemented by selecting one of the hits in the Reserved field in a multicast protocol and setting the selected bit to 1 to indicate that there is an extension of the subsequent virtual network identification information. The specific virtual network identification information may be presented in a TLV form of different types. It is also possible to define virtual network tag information TLV, and then define different sub-TLV or sub-sub-TLV according to different types of virtual network identifiers. Optionally, since the MLD packet is encapsulated in an Internet Control Message Protocol Version 6 (ICMPv6) protocol packet, an indication identifier may also be added to the ICMPv6 packet to indicate that a subsequent MLD packet carries virtual network identification information.

Figure 6:
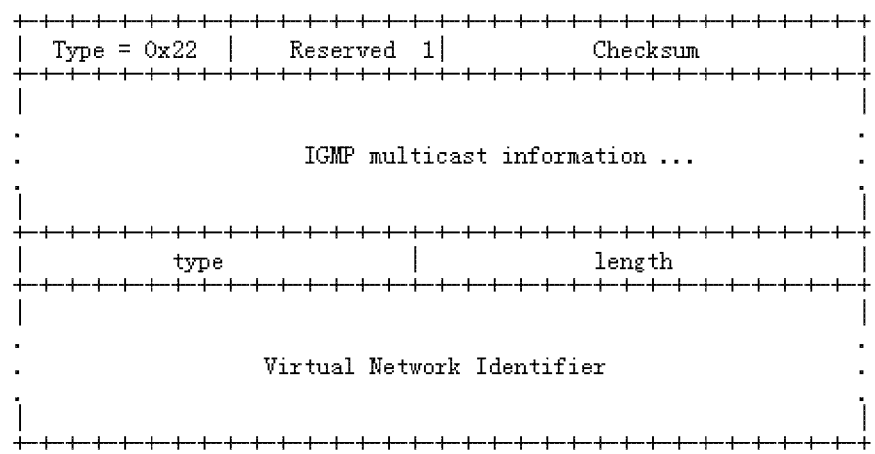
FIG. 6 is a schematic diagram of an IGMP protocol extension according to an embodiment of the disclosure.

FIG. 6 is a schematic diagram of an IGMP protocol extension according to an embodiment of the disclosure. As shown in FIG. 6, in an IGMP packet header, a related reserved field may be used to select one bit to be set to 1 so as to represent that there is subsequent virtual network identification information; and new fields may also be defined for representation. In addition, the virtual network identification information may be added in both IGMP query and report packets or may only be added in the Report packet. This is only an example.

FIG. 7 is a schematic diagram of a PIM protocol extension according to an embodiment of the disclosure. As shown in FIG. 7, in a PIM join pruning message, a new type is used to identify that this is virtual network identification information. Here, it is assumed that the type value is 6. The same specific information content may be identified in the form of a TLV.

Figure 8:
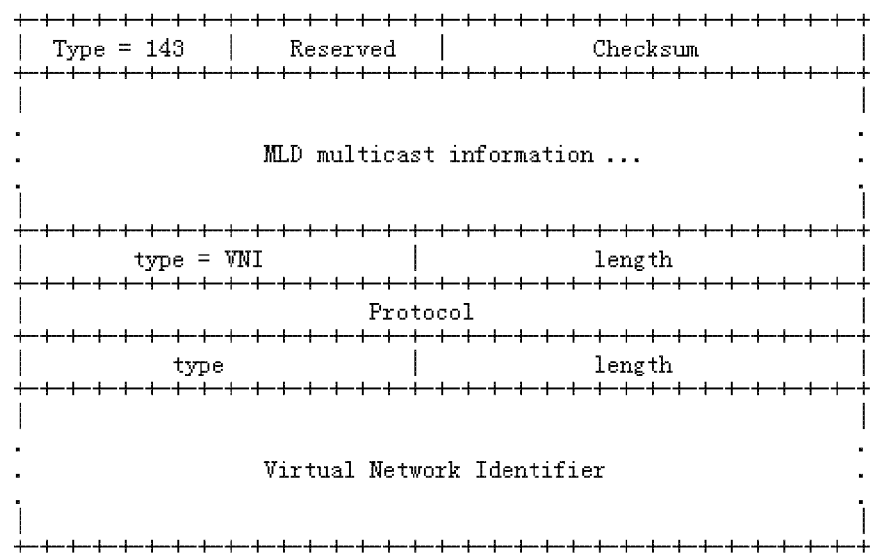
FIG. 8 is a schematic diagram of another MLD protocol extension according to an embodiment of the disclosure.

FIG. 8 is a schematic diagram of another MLD protocol extension according to an embodiment of the disclosure. As shown in FIG. 8, adding a TLV type in an MLD message indicates that virtual network identification information is carried, and a Protocol field indicates the type of the virtual network identification information. Inside the virtual network identification information, the content of different types of virtual network identification information is identified by defining a sub-TLV.

Figure 9:
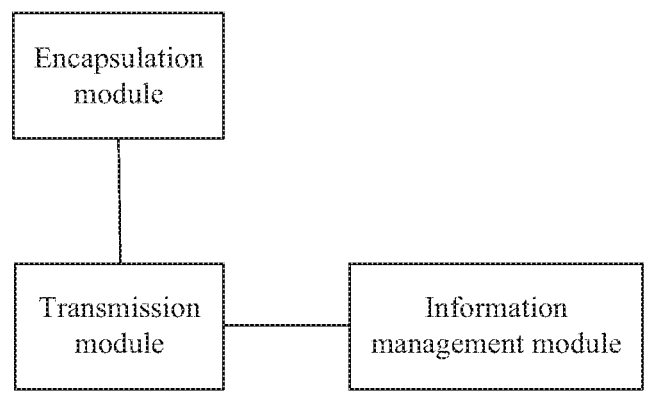
FIG. 9 is a schematic diagram of an information transmission device according to an embodiment of the disclosure.

FIG. 9 is a schematic diagram of an information transmission device according to an embodiment of the disclosure. As shown in FIG. 9, an information transmission device provided in the present embodiment is applied to a network edge node, and includes: an encapsulation module, arranged to encapsulate, when the network edge node per se is connected to a virtual network, a virtual network identifier of the connected virtual network into a multicast protocol packet; and a transmission module, arranged to send the multicast protocol packet to one or more network edge nodes other than the network edge node per se.

Optionally, the transmission module is further arranged to receive the multicast protocol packet encapsulated with the virtual network identifier from the one or more network edge nodes other than the network edge node per se.

Optionally, the device further includes: an information management module, arranged to determine, according to the received multicast protocol packet, a network edge node set corresponding to the virtual network identifier of the virtual network to which the network edge node per se is connected.

Optionally, the transmission module is further arranged to send, in a multicast manner, a packet encapsulated with to-be-transmitted data of a virtual network to which the network edge node per se is connected to network edge nodes in a network edge node set corresponding to a virtual network identifier of the virtual network.

Optionally, the virtual network identifier includes: a VxLAN identifier, a NVGRE virtual sub-network identifier or an identifier capable of uniquely identifying a virtual network.

Optionally, the multicast protocol packet includes: an MLD packet, an IGMP packet, and a PIM packet.

Optionally, the virtual network identifier is encapsulated in the multicast protocol packet in a TLV form.

Optionally, a packet header of the multicast protocol packet carries a virtual network indication identifier, used to indicate whether the multicast protocol packet carries a virtual network identifier.

In addition, the specific process of the above device is the same as the above method, so it will not be repeated here.

To sum up, the embodiments of the disclosure can implement signaling propagation of a virtual network identifier in a network, so that the information management module can conveniently obtain a corresponding relationship between each virtual network and a network edge node set related thereto, so that when broadcast or multicast packets of the virtual network need to be propagated by network encapsulation, an efficient multicast IP packet, BIER packet or point-to-multipoint tunnel mode for delivery according to the corresponding relationship, which has good adaptability and development prospects. By means of the embodiments of the disclosure, various functions such as broadcasting, synchronization and backup of data of a virtual network (including a DC) can be easily implemented, important functions of an intermediate network connected with the virtual network are implemented, the use and deployment scenarios of the DC are expanded, and the development of the DC, the development of SDN and NFV technologies and the development of an intermediate network technology are promoted.

In addition, the embodiment of the disclosure also provides a computer-readable storage medium, which stores a computer-executable instruction. When the computer-executable instruction is executed, the information transmission method is implemented.

Through the description of the above implementation manners, those skilled in the art can clearly understand that the method according to the above embodiment may be implemented by means of software plus a necessary general hardware platform. Of course, the hardware can also be used, but in many cases, the former is a better implementation manner. Based on this understanding, the essence of the technical solution of the disclosure or parts contributing to the related art may be embodied in the form of a software product stored on a storage medium (such as ROM/RAM, magnetic disk, and optical disk). In the above, several instructions are included to enable a terminal device (which may be a mobile phone, a computer, a server, or a network device, etc.) to perform the methods described in the various embodiments of the disclosure.

Those skilled in the art should understand that the above-mentioned modules or steps of the disclosure may be implemented using general-purpose computing devices, which may be concentrated on a single computing device or distributed on a network formed by multiple computing device. Rather, they may be implemented with a program code that is executable by the computing device so that they may be stored in a storage device and executed by the computing device, and in some cases, the shown or described steps may be performed in a different order than shown here. Or, they are separately made into a single integrated circuit module, or multiple modules or steps are made into a single integrated circuit module. Thus, the disclosure is not limited to any specific combination of hardware and software.

The basic principle and main features of the disclosure and the advantages of the disclosure have been shown and described above. The disclosure is not limited by the foregoing embodiments. The foregoing embodiments and descriptions describe only the principle of the disclosure. Various changes and improvements may be made to the disclosure without departing from the spirit and scope of the disclosure. Both changes and improvements fall within the scope of the claimed disclosure.

INDUSTRIAL APPLICABILITY

The embodiment of the disclosure provides an information transmission method and device, capable of implementing signaling propagation of a virtual network identifier in a network, thereby implementing efficient transmission of virtual network data.

The invention claimed is:
1. An information transmission method, comprising:
when a network edge node is connected to a virtual network, encapsulating, by the network edge node, a virtual network identifier of the connected virtual network into a multicast protocol packet;
sending, by the network edge node, the multicast protocol packet to one or more network edge nodes other than the network edge node per se;
receiving, by the network edge node, a multicast protocol packet encapsulated with a virtual network identifier from each of the one or more network edge nodes other than the network edge node per se;
learning, by the network edge node, network edge node information corresponding to respective different virtual networks through the received multicast protocol packet to organize and generate a corresponding relationship between the virtual network identifier of the virtual network to which the network edge node per se is connected and a network edge node set corresponding to the virtual network identifier of the virtual network to which the network edge node per se is connected;

determining, by the network edge node according to the corresponding relationship, the network edge node set corresponding to the virtual network identifier of the virtual network to which the network edge node per se is connected, and
after the network edge node determines, according to the corresponding relationship, the network edge node set corresponding to the virtual network identifier of the virtual network to which the network edge node per se is connected, sending, by the network edge node in a multicast manner, a Bit Indexed Explicit Replication (BIER) packet encapsulated with to-be-transmitted data of the virtual network to which the network edge node per se is connected to one or more network edge nodes in the network edge node set corresponding to the virtual network identifier of the virtual network, wherein the one or more edge nodes in the network edge node set corresponding to the virtual network identifier of the virtual network are indicated in a destination address of the BIER packet.

2. The method according to claim 1, wherein the virtual network identifier comprises: a Virtual Extensible Local Area Network (VxLAN) identifier, a Network Virtualization using Generic Routing Encapsulation (GRE) (NVGRE) virtual sub-network identifier or an identifier capable of uniquely identifying a virtual network.

3. The method according to claim 1, wherein the multicast protocol packet comprises: a Multicast Listener Discover (MLD) packet, an Internet Group Management Protocol (IGMP) packet, and a Protocol Independent Multicast (PIM) packet.

4. An information transmission device, applied to a network edge node, comprising:
a memory storing processor-executable instructions; and
a processor arranged to execute the stored processor-executable instructions to perform steps of:
when the network edge node is connected to a virtual network, encapsulating, by the network edge node, a virtual network identifier of the connected virtual network into a multicast protocol packet;
sending, by the network edge node, the multicast protocol packet to one or more network edge nodes other than the network edge node per se;
receiving, by the network edge node, a multicast protocol packet encapsulated with a virtual network identifier from each of the one or more network edge nodes other than the network edge node per se;
learning, by the network edge node, network edge node information corresponding to respective different virtual networks through the received multicast protocol packet to organize and generate a corresponding relationship between the virtual network identifier of the virtual network to which the network edge node per se is connected and a network edge node set corresponding to the virtual network identifier of the virtual network to which the network edge node per se is connected;
determining, by the network virtual node according to the corresponding relationship, the network edge node set corresponding to the virtual network identifier of the virtual network to which the network edge node per se is connected, and
after the network edge node determines, according to the corresponding relationship, the network edge node set corresponding to the virtual network identifier of the virtual network to which the network edge node per se is connected, sending, by the network edge node in a multicast manner, a Bit Indexed Explicit Replication (BIER) packet encapsulated with to-be-transmitted data of the virtual network to which the network edge node per se is connected to one or more network edge nodes in the network edge node set corresponding to the virtual network identifier of the virtual network, wherein the one or more edge nodes in the network edge node set corresponding to the virtual network identifier of the virtual network are indicated in a destination address of the BIER packet.

5. The device according to claim 4, wherein the virtual network identifier comprises: a Virtual Extensible Local Area Network (VxLAN) identifier, a Network Virtualization using Generic Routing Encapsulation (GRE) (NVGRE) virtual sub-network identifier or an identifier capable of uniquely identifying a virtual network.

6. The device according to claim 4, wherein the multicast protocol packet comprises: a Multicast Listener Discover (MLD) packet, an Internet Group Management Protocol (IGMP) packet, and a Protocol Independent Multicast (PIM) packet.

7. A non-transitory computer-readable storage medium having stored thereon computer-executable instructions, which when executed by a processor, causing the processor to perform an information transmission method, the method comprising:
when a network edge node is connected to a virtual network, encapsulating, by the network edge node, a virtual network identifier of the connected virtual network into a multicast protocol packet;
sending, by the network edge node, the multicast protocol packet to one or more network edge nodes other than the network edge node per se;
receiving, by the network edge node, a multicast protocol packet encapsulated with a virtual network identifier from each of the one or more network edge nodes other than the network edge node per se;
learning, by the network edge node, network edge node information corresponding to respective different virtual networks through the received multicast protocol packet to organize and generate a corresponding relationship between the virtual network identifier of the virtual network to which the network edge node per se is connected and a network edge node set corresponding to the virtual network identifier of the virtual network to which the network edge node per se is connected;
determining, by the network edge node according to the corresponding relationship, a network edge node set corresponding to the virtual network identifier of the virtual network to which the network edge node per se is connected, and
after the network edge node determines, according to the corresponding relationship, the network edge node set corresponding to the virtual network identifier of the virtual network to which the network edge node per se is connected, sending, by the network edge node in a multicast manner, a Bit Indexed Explicit Replication (BIER) packet encapsulated with to-be-transmitted data of the virtual network to which the network edge node per se is connected to one or more network edge nodes in the network edge node set corresponding to the virtual network identifier of the virtual network, wherein the one or more edge nodes in the network edge node set corresponding to the virtual network identifier of the virtual network are indicated in a destination address of the BIER packet.

8. The non-transitory computer-readable storage medium according to claim 7, wherein the virtual network identifier comprises: a Virtual Extensible Local Area Network (Vx-LAN) identifier, a Network Virtualization using Generic Routing Encapsulation (GRE) (NVGRE) virtual sub-network identifier or an identifier capable of uniquely identifying a virtual network.

9. The non-transitory computer-readable storage medium according to claim 7, wherein the multicast protocol packet comprises: a Multicast Listener Discover (MLD) packet, an Internet Group Management Protocol (IGMP) packet, and a Protocol Independent Multicast (PIM) packet.

* * * * *